Figure 1:
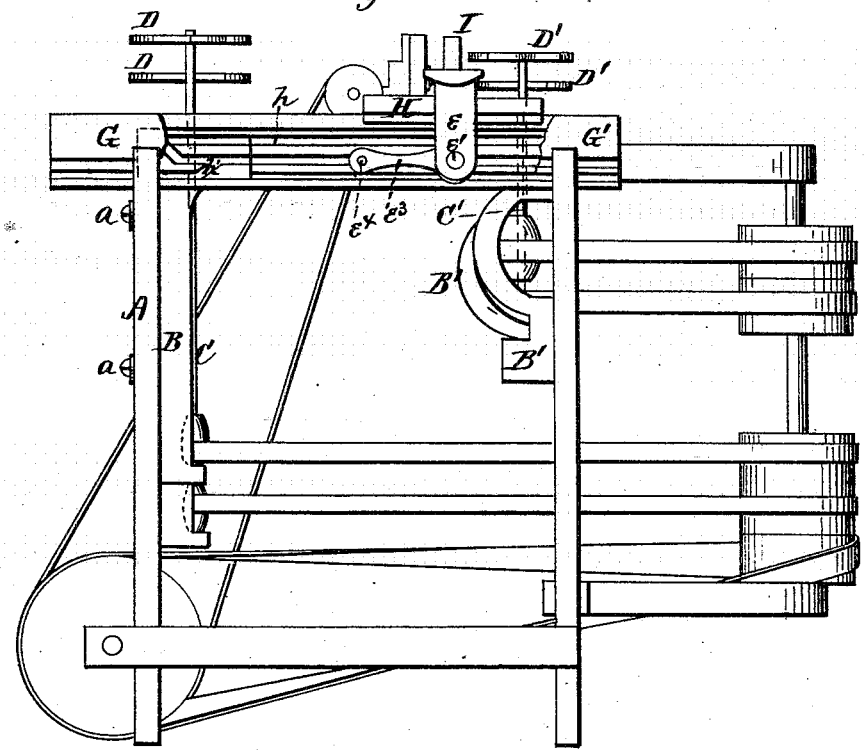

3 Sheets--Sheet 1.

O. J. PENNELL & G. ZIMMER.
Sash-Dovetailing Machines.

No. 157,134. Patented Nov. 24, 1874.

WITNESSES.

INVENTOR
Oscar J. Pennell.
George Zimmer.

By Alexander Mator
Attorneys.

3 Sheets--Sheet 2.
O. J. PENNELL & G. ZIMMER.
Sash-Dovetailing Machines.
No. 157,134. Patented Nov. 24, 1874.
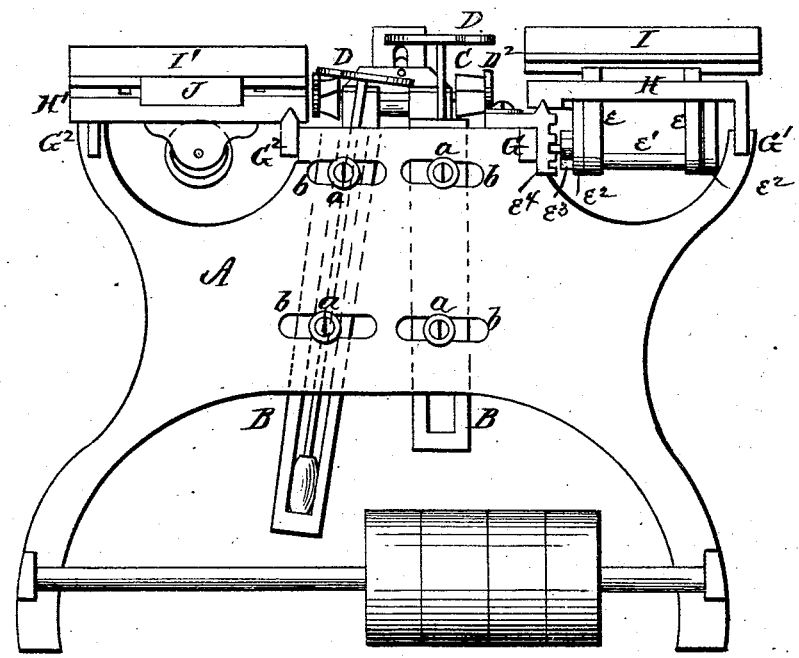
Fig 2
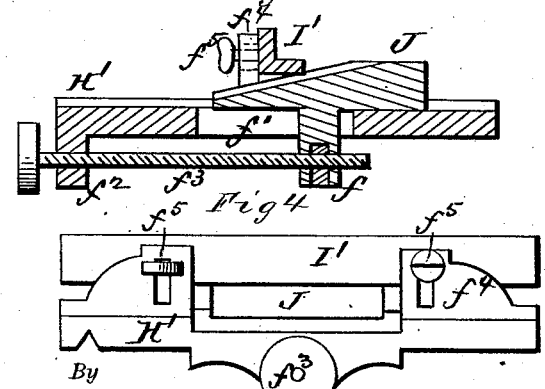
Fig 3
Fig 4
WITNESSES.
F. L. Durand
C. L. Evert
INVENTOR
O. J. Pennell
G. Zimmer
Alexander Mason
Attorneys.

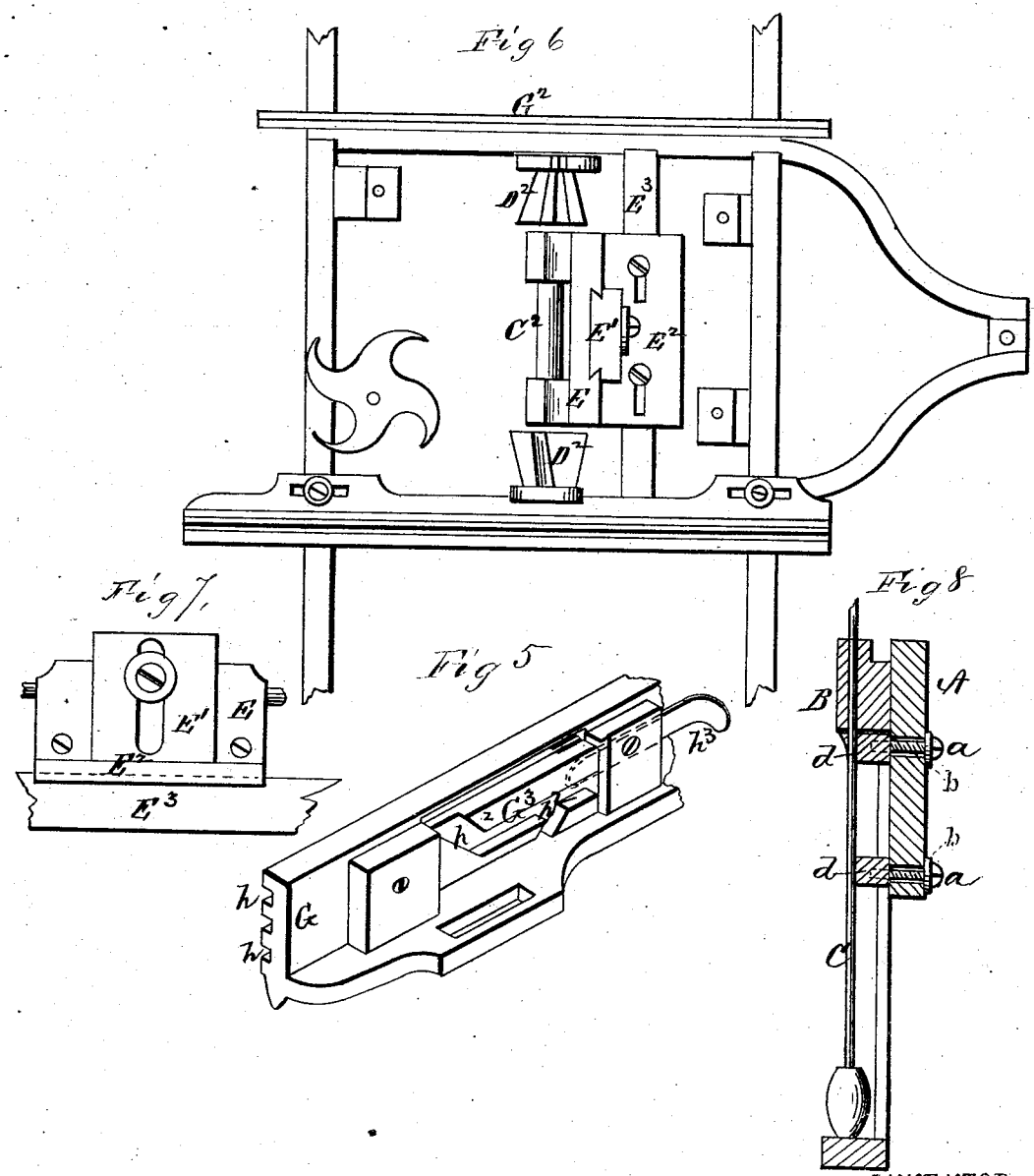

UNITED STATES PATENT OFFICE.

OSCAR J. PENNELL AND GEORGE ZIMMER, OF WILLIAMSPORT, PA.

IMPROVEMENT IN SASH-DOVETAILING MACHINES.

Specification forming part of Letters Patent No. 157,134, dated November 24, 1874; application filed April 4, 1874.

*To all whom it may concern:*

Be it known that we, OSCAR J. PENNELL and GEORGE ZIMMER, of Williamsport, in the county of Lycoming and in the State of Pennsylvania, have invented certain new and useful Improvements in Sash-Dovetailing Machines; and do hereby declare that the following is a full, clear, and exact description thereof, reference being had to the accompanying drawings and to the letters of reference marked thereon, making a part of this specification.

The nature of our invention consists in the construction and arrangement of a machine for dovetailing sash, as an improvement upon Letters Patent No. 120,594, dated November 7, 1871, granted to us, as will be hereinafter more fully set forth.

In order to enable others skilled in the art to which our invention appertains to make and use the same, we will now proceed to describe its construction and operation, referring to the annexed drawings, in which—

Figure 1 is an end view, and Fig. 2 a side elevation, of our machine. Fig. 3 is a transverse vertical section, and Fig. 4 a rear view, of one of the sliding carriages used in our machine. Figs. 5, 6, 7, and 8 are detached views of certain parts thereof.

A represents the frame of our machine, constructed in any suitable manner to contain the working parts, and of sufficient strength to withstand the vibrations of the parts. B B represent two elongated frames, attached to the inner side of one of the sides of the main frame A by means of set-screws $a$ $a$, which pass through slots $b$ $b$ in the side of the main frame, into slides $d$ $d$, arranged in the frames B B. By these means the frames B B may be adjusted to stand in a perpendicular position, or at any angle desired, the one independent of the other, whereby the cutters held in or by said frames may be set to cut the dovetail on the sash at any desired angle or inclination. In each frame B is placed a vertical arbor, C, parallel with the frame, and provided at its upper end with a cutter-head, D, made adjustable up and down on the arbor. On the opposite side of the main frame A are similar frames B' B', made adjustable in similar manner, and each provided with an arbor, $C^1$, carrying an adjustable cutter-head, $D^1$. Either one of the arbors, C or $C^1$, may have more than one cutter-head, as may be required. $C^2$ represents a horizontal arbor carrying a cutter-head, $D^2$, at each end. This arbor is held in suitable bearings in a frame or carriage, E, which is made adjustable up and down on a post or standard, $E^1$. This standard is attached on a bed-plate, $E^2$, placed upon and adjustably attached to a cross-bar, $E^3$, in the main frame A, whereby the cutters $D^2$ are adjusted laterally as well as vertically, according to the work desired to be done. On the top of the main frame A, at one side, are two parallel rails, G and $G^1$, for supporting a carriage, H. On top of this carriage is a T-shaped rest, I, provided with two arms, $e$ $e$, which extend downward into the carriage, and their lower ends attached to a shaft, $e^1$. This shaft has its bearings in suitable projections $e^2$ on the under side of the carriage, and on the inner end of said shaft is secured an arm, $e^3$, from the outer end of which projects a pin, $e^4$, into longitudinal grooves $h$ $h$, made on the outer side of the inner rail G. The grooves $h$ $h$ on this rail are connected by inclines $h^1$, as shown in Fig. 1. These inclines also form stops for the pin $e^4$ of the arm $e^3$, to hold the carriage steady while working. The rail G is adjustable longitudinally on the main frame A, to locate these stops at the desired points. On the opposite side of the main frame are two other parallel rails, $G^2$ $G^2$, for supporting the carriage H'. Across this carriage is a shallow recess for the reception of an inclined or wedge-shaped slide, J, which is provided on its under side with a projection or lug, $f$, Fig. 3, extending downward through a slot, $f^1$, in the carriage. On the under side of the carriage is also a lug, $f^2$, for the passage of a screw-shaft, $f^3$, which screws through the lug $f$, so that by turning the screw-shaft $f^3$ the slide J will be moved either out or in, as desired. On top of the carriage H', on each side of the slot $f^1$, is a vertically-slotted post, $f^4$, through which passes a screw, $f^5$, into an L-shaped guide or rest, I'. This rest is fitted on the inclined surface of the slide J, so that by adjusting said slide back and forth, as above described, the rest I' can be adjusted up and down.

The object of this machine is to increase the facility and lessen the cost of dovetailing sash.

To make the tenon on check-rails, the carriage H is placed in proper position on the rails G G$^1$, and the pin $e^4$ placed in the proper groove $h$, to hold the rest I at the requisite angle. The cutter-heads being adjusted to suit the work wanted by suitable hand or set screws, the check-rail is placed on the front of the rocking rest and is run through, cutting and completing the tenon and dovetail on one end. The operator in drawing the carriage back, with his hand tips the rest enough to guide the pin $e^4$ into another groove; then, placing the rail on the side of the rest toward himself, runs it through the cutters same as the first end, and completing the operation. In running the check-rails for top sash, the only change necessary is the turning of the adjustable frog or block G$^3$ in the rail G, Fig. 5. This frog forms a part of the rail, and contains the inclined grooves $h^1 h^1$ on one side, and other inclines, $h^2 h^2$, on the other side, and is held with either side out by means of a latch, $h^3$, the inclines forming, as above mentioned, stops for the movement of the carriage. This side of the machine is only intended for check or other rails. The other side, with the rails G$^2$ and carriage H$'$, is for making the dovetail in stiles, the object being to obviate the necessity of changing the machine.

The center arbor with cutting-head on each end being set on the check-rail side, the stiles can be run to suit by means of the adjustable rest I$'$ on the carriage H$'$, making the change for material of different thickness with the carriage instead of the cutters.

This machine will make check-rails and stiles at one time. It finishes both check-rails and stiles at one operation. It copes for the bead and cuts the shoulder on the outside of the stile and rail to fit each other, requiring no trimming to put together.

Having thus fully described our invention, what we claim as new, and desire to secure by Letters Patent, is—

1. The inverted T-shaped rocking rest I, forming a guide on each side, in combination with the movable carriage H, arms $e\ e$, shaft $e^1$, arm $e^3$, pin $e^4$, and grooved rail G, and in combination with the cutters D and D$^2$, all substantially as and for the purposes herein set forth.

2. The pivoted frog or block G$^3$, arranged in the rail G, and held by means of a latch, $h^3$, substantially as and for the purposes herein set forth.

3. The combination, in a machine for dovetailing sash, of the movable slotted carriage H$'$, wedge-shaped slide J, operated by the screw-shaft $f^3$, and the up-and-down adjustable L-shaped rest I$'$, all constructed substantially as and for the purposes herein set forth.

In testimony that we claim the foregoing we have hereunto set our hands this 24th day of March, 1874.

OSCAR J. PENNELL.
GEORGE ZIMMER.

Witnesses:
C. L. EVERT,
A. R. MOORE.